C. PEARSON.
MOWING MACHINE.
APPLICATION FILED OCT. 28, 1912.
1,205,255.
Patented Nov. 21, 1916.
2 SHEETS—SHEET 2.
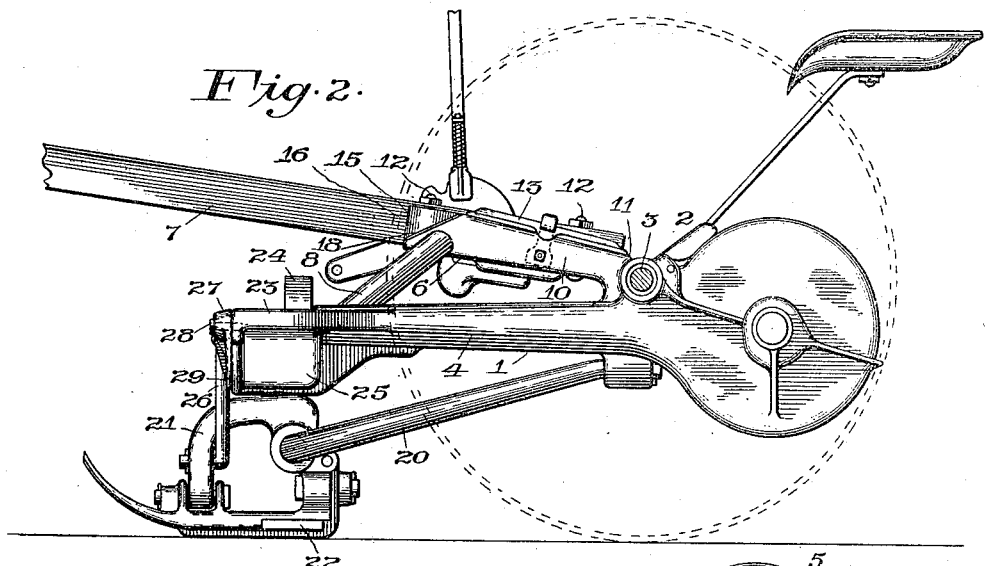
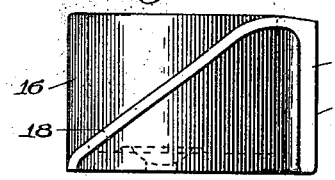
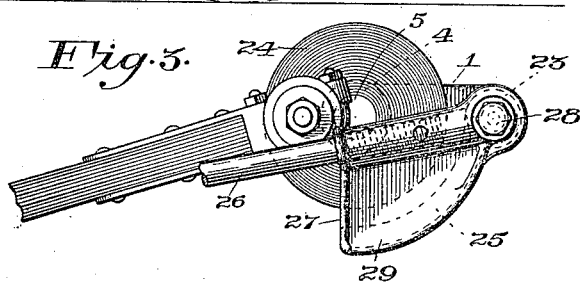
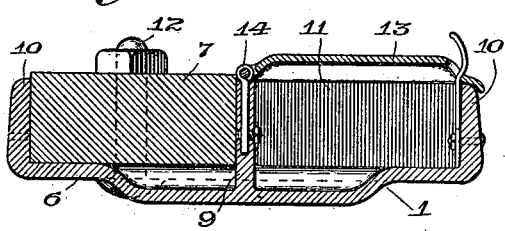
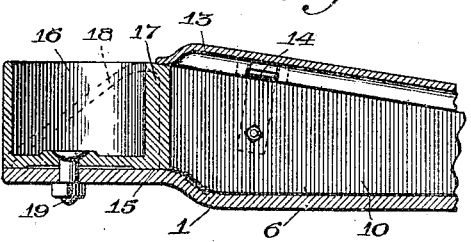
Witnesses:
F. W. Hoffmeister
C. C. Palmer
Inventor.
Charles Pearson
By Chas. E. Lord
Attorney

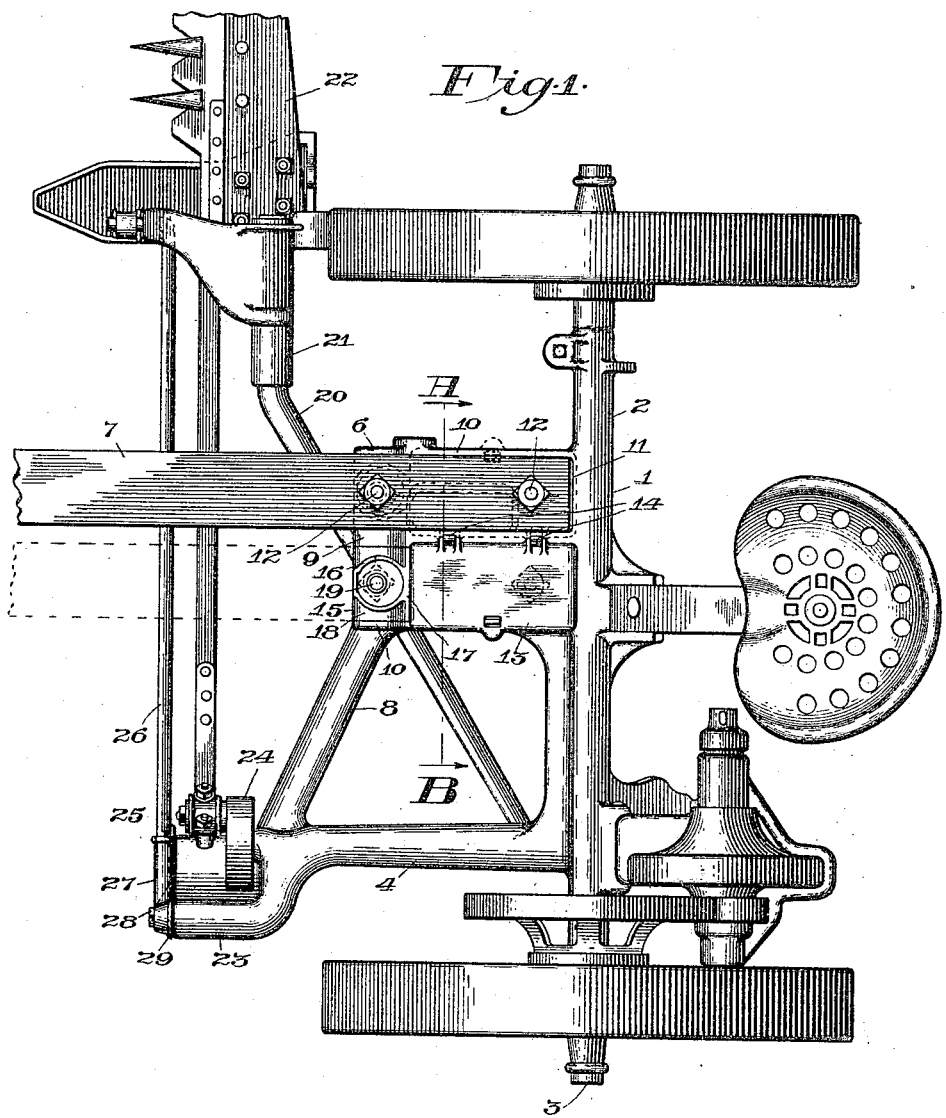

UNITED STATES PATENT OFFICE.

CHARLES PEARSON, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,205,255.      Specification of Letters Patent.      Patented Nov. 21, 1916.

Application filed October 28, 1912. Serial No. 728,109.

*To all whom it may concern:*

Be it known that I, CHARLES PEARSON, a citizen of the United States, residing at Chicago, in the county of Cook and State of Illinois, have invented certain new and useful Improvements in Mowing-Machines, of which the following is a specification.

My invention relates to mowing machines, and in particular to the construction of the main frame of the machine whereby the draft tongue may be adjusted bodily laterally, and in providing separate box-like members to receive the rear end of the draft tongue, that are utilized as tool boxes and receivers for the lubricant can, the object of my invention being to provide an improved main frame whereupon the pole may be adjusted in a plurality of positions in an improved manner and the unoccupied pole support may be transformed into a tool box. These and other objects of my invention will hereinafter appear. I attain these objects by means of mechanism, one embodiment of which is illustrated in the accompanying drawings, in which—

Figure 1 represents a top plan view of part of a mowing machine having my improved main frame forming a part thereof; Fig. 2 is a side elevation of Fig. 1; Fig. 3 is a detached detail of the frame and designed to illustrate the construction of the crank wheel bowl and the manner of connecting the brace member of the coupling frame therewith; Fig. 4 is a side elevation of a removable member forming part of the tongue receiving box and designed to receive the can for lubricant; Fig. 5 represents a cross section of the two tongue receiving boxes along line A—B of Fig. 1; and Fig. 6 represents a longitudinal section of one of the boxes with the rear end broken away.

The same reference numerals designate like parts throughout the several views.

1 represents the main frame of the machine, including a transverse tubular member 2, having the main driving shaft and wheel axle 3 journaled therein, a forwardly projecting tubular member 4 having the crank shaft 5 journaled therein, and 6 represents a forwardly projecting web forming part of the main frame and having the rear end of the draft tongue 7 secured thereto.

8 represents a brace member extending from the front end of the tongue supporting web diagonally stubbleward toward the front end of member 4. It is desirable in this class of machines to make provision whereby the central line of draft may be adjusted laterally stubbleward when two draft animals are used, and grainward when a single one is used. To permit of such an adjustment it has been the practice to furnish a short stub tongue to be secured to the main frame and then to secure the tongue member carrying the thills for a single draft animal to one side of the stub tongue.

My invention consists in providing means whereby such an adjustment of the line of draft may be made in a suitable manner. The means include vertically arranged web members integral with the web 6, spaced apart in a manner to receive the rear end of the draft tongue 7 between them, there being a central member 9 and outside members 10 upon opposite sides thereof, with the rear end walls 11 forming two parallel boxes, to either of which the rear end of the draft tongue may be secured by bolts 12.

13 represents a cover that is secured to the central member 9 by means of reversible eye members 14 that are releasably connected therewith in a manner whereby the position of the cover may be reversed so as to be used in connection with either box as desired.

15 represents a removable piece having a cylindrical cup 16 adapted to form a holder for a lubricant can and provided with a vertical transverse member 17 that forms a wall for the front end of either of the tongue boxes, thus making a convenient tool box, the laterally projecting ribs 18 integral with the holder being arranged to conform with the front ends of the members 9 and 10, the holder being secured in either position by means of a bolt 19.

20 represents a coupling bar having the stubbleward end thereof pivotally connected with the main frame at a point in line with the axis of the crank shaft 5 and in a manner permitting the opposite end of said bar to rise and fall in a common way. The coupling bar extends diagonally forward and grainward from its pivotal connection with the main frame, and the inner end is turned in a direction at right angles with the line of draft, and sleeved thereon is a coupling yoke 21, to which is connected the finger bar 22 in the usual way. The tubular member 4 is provided at the front end thereof with a laterally and forwardly projecting arm 23 upon the stubbleward side of the crank wheel 24, and 25 represents a downwardly extending web connected with said arm and arranged concentric with the axis of the crank shaft.

26 represents a coupling member arranged at right angles with the line of draft and having the grainward end thereof pivotally connected with the yoke 21 and its opposite end threaded in a manner to be adjustably connected with a coupling member 27 that is pivotally connected with the end of arm 23 by means of a stud bolt 28, and 29 represents a web member forming part of the coupling member and arranged concentric with the web member 25, the associated parts of the mechanism when assembled forming a bowl for the protection of the crank wheel, and, if desired, the coupling member 27 may be readily detached from the main frame and turned downward, permitting the crank wheel and its shaft to be withdrawn forward from the machine. It is to be understood, however, that herein I do not claim this bowl and coupling construction, the same forming the subject matter of another copending application, Serial No. 808,145, filed December 22, 1913.

It is to be noted that in my improved construction the tongue may be readily adjusted in such a manner as to enable a reaping attachment to be placed upon the mower without the necessity for the provision of a separate stub tongue, such as has been used heretofore. Attention is also directed to the fact that the tongue may also be adjusted whenever it is desired to give more horse room, as when it is desired to attach three horses to the mower, and that this adjustment may also take place whenever it is desired to keep the draft animals away from the grain, as when the machine is used in harvesting the latter. Obviously, in either of the positions of the tongue, through my improved construction, the unused socket forms a commodious and convenient tool box and oil can holder.

While I have in this application specifically described my improved frame and the means for adjusting the pole therein, as well as for transforming the unoccupied pole socket into a tool box and oil can holder, it is to be understood that this form of my invention is used for purposes of illustration and that the invention itself may be modified without departing from its spirit, it being my intention to include all such modifications within the scope of the appended claims.

What I claim as my invention, and desire to secure by Letters Patent, is:

1. In a mowing machine, a main frame having a plurality of pole sockets thereon, a pole carried in one of said sockets, and means transforming the remaining socket into a tool receptacle.

2. In a mowing machine, a main frame having a plurality of parallel pole sockets thereon, a pole carried in one of said sockets, and means transforming the remaining socket into a tool receptacle.

3. In a mowing machine, a main frame having a plurality of parallel pole sockets therein, a pole carried in one of said sockets, an oil can holder closing a portion of the other socket, and a tool box cover extending over the remainder of said socket.

4. In a mowing machine, a frame including two box members disposed in parallel relation in a horizontal plane with a division wall between the same, and a cover attached to said division wall and capable of being placed in different positions to close either of said boxes.

5. In a mowing machine, a frame, a plurality of parallel tongue boxes carried thereon, having an upstanding wall between the same, and an oil can holder attached to said frame and capable of being placed in different positions to form the end of either of said boxes.

6. A mowing machine including, in combination, a main frame including two forwardly extending box members arranged in a horizontal plane, in parallel relation and separated by a division wall, means whereby a draft tongue may be secured in either of said boxes, and a reversible cover hinged to said division wall and adapted to close either of said boxes.

7. A mowing machine including, in combination, a main frame including two forwardly extending box members arranged in a horizontal plane, in parallel relation and separated by a division wall, means whereby a draft tongue may be secured in either of said boxes, a reversible cover hinged to said division wall and adapted to close either of said boxes, and a removable end wall adapted to close the front end of either of said boxes.

8. A mowing machine including, in combination, a main frame including two forwardly extending box members arranged in a horizontal plane, in parallel relation and separated by a division wall, means whereby a draft tongue may be secured in either of said boxes, a reversible cover hinged to said division wall and adapted to close either of said boxes, and a combined removable end wall and lubricant can receiver adapted to close the front end of either of said boxes.

CHARLES PEARSON.

Witnesses:
RAY PATTISON,
FRANK A. ZABILKA.

Copies of this patent may be obtained for five cents each, by addressing the "Commissioner of Patents Washington, D. C."